(12) United States Patent
Chu et al.

(10) Patent No.: US 10,164,561 B2
(45) Date of Patent: Dec. 25, 2018

(54) MOTOR CONTROL SYSTEM AND MOTOR CONTROL METHOD (71) Applicant: ANPEC ELECTRONICS CORPORATION, Hsinchu (TW)

(72) Inventors: Chien-Lun Chu, Kaohsiung (TW); Ching-Feng Lai, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/722,752

(22) Filed: Oct. 2, 2017

(65) Prior Publication Data
US 2018/0342971 A1 Nov. 29, 2018

(30) Foreign Application Priority Data

May 26, 2017 (TW) .............................. 106117604 A (51) Int. Cl.
*G05B 11/28* (2006.01)
*H02P 27/04* (2016.01)
*H02P 27/08* (2006.01)

(52) U.S. Cl.
CPC ............ *H02P 27/045* (2013.01); *H02P 27/08* (2013.01)

(58) Field of Classification Search
CPC ...... H02P 1/00; H02P 3/00; H02P 5/00; H02P 6/00; H02P 1/46; H02P 3/18; H02P 21/00; H02P 27/04; H02P 27/06; H02P 41/00; H02P 23/00; G05B 11/28
USPC .............. 318/400.01, 400.02, 779, 799, 800, 318/400.14, 400.15, 700, 701, 721, 599, 318/811, 801, 430, 432; 388/800, 819, 388/821, 811
See application file for complete search history.

(56) References Cited

U.S. PATENT DOCUMENTS

| 6,995,679 | B2 * | 2/2006 | Eskritt | .................... B62D 5/065 |
| | | | | 340/686.1 |
| 7,202,622 | B2 * | 4/2007 | Eskritt | .................... B62D 5/065 |
| | | | | 318/400.24 |
| 7,747,146 | B2 * | 6/2010 | Milano | ...................... H02P 6/16 |
| | | | | 318/400.09 |
| 9,973,119 | B2 * | 5/2018 | Leman | ...................... H02P 6/08 |

* cited by examiner

*Primary Examiner* — Antony M Paul
(74) *Attorney, Agent, or Firm* — Li & Cai Intellectual Property (USA) Office (57) ABSTRACT

A motor control system is provided in the present disclosure. The motor control system includes a motor and a control module providing a control signal for driving the motor. The control system includes a processing module, a duty cycle detecting module for receiving a PWM signal from a system, a speed detecting module for providing a speed signal of the motor, a setting module for setting a configuration of the control module. The processing module adjusts the control signal to drive the motor based on a duty cycle value, a speed and a configuration value.

13 Claims, 8 Drawing Sheets

MOTOR CONTROL SYSTEM AND MOTOR CONTROL METHOD

FIELD OF THE INVENTION

The present disclosure relates to a motor control system, and particular to a motor control system and motor control method for adjusting motor current.

BACKGROUND OF THE INVENTION

A load of a rotating motor changes under different environmental conditions, and the changed load makes waveform of current driving the motor be deformed and thus unbalanced. However, since the conventional compensation method uses either leading phase angle driving or soft switching driving, it can only be used for adjusting the current of a specific motor load, and would have difficulty adjusting the motor current under a different load or changed load.

Therefore, it is important to provide a motor control system for adjusting the motor current under a changed load.

SUMMARY OF THE INVENTION

Accordingly, the present disclosure provides a motor control system including: a motor; and a control module providing at least one control signal to drive the motor. The control module includes: a processing module; a duty cycle detecting module electrically connected to the processing module to receive a PWM signal of a system to output a duty cycle signal to the control module, the processing module providing the control signal to drive the motor according to the duty cycle signal; a speed detecting module electrically connected to the processing module to provide a speed signal corresponding to the current motor speed; a driving module electrically connected to the processing module to provide at least one driving signal to drive the motor; and a setting module electrically connected to the processing module to set a configuration of the control module, the setting module including at least one target speed setting value. The processing module adjusts the control signal to drive the motor according to a duty cycle value of the duty cycle signal, a speed of the speed signal and the configuration.

In an embodiment, the driving module is electrically connected to a first switch, a second switch, a third switch and a fourth switch, and the driving module provides at least one driving signal to the first switch, the second switch, the third switch and the fourth switch according to the control signal of the processing module to drive the motor.

In an embodiment, the processing module adjusts the driving signal according to the following equation to drive the motor: AA=Output_duty*RPM_diff. AA is an adjustment angle, and the driving signal needs to be adjusted within a range of the adjustment angle, Output_duty is the duty cycle value, and RPM_diff is the speed.

In an embodiment, the speed is an actual speed of the speed signal minus the target speed setting value of the speed signal.

In an embodiment, the duty cycle value is a percentage of a duty cycle.

In an embodiment, the control module further includes a phase angle leading module electrically connected to the processing module and the driving module to adjust a phase angle leading information of the control signal to drive the motor.

In an embodiment, the control module further includes a soft switching module electrically connected to the processing module and the driving module to adjust a soft switching information of the control signal to drive the motor.

In an embodiment, the control module further includes a phase angle leading module electrically connected to the processing module and the driving module to adjust a phase angle leading information of the control signal to drive the motor; and a soft switching module electrically connected to the processing module and the driving module to adjust a soft switching information of the control signal to drive the motor. The processing module uses one of the phase angle leading module and the soft switching module to adjust the control signal to drive the motor.

The present disclosure further provides a motor control method for a motor control system having a control module and a motor, the motor control method including the following steps: setting a configuration, the setting module including at least one target speed setting value; and adjusting a control signal of the control module according to the configuration, a speed, a duty cycle value to drive the motor.

In an embodiment, the configuration includes at least one speed interval and at least one duty cycle interval.

In an embodiment, the control module adjusts the control signal according to the following equation to drive the motor: AA=Output_duty*RPM_diff. AA is an adjustment angle, and the driving signal needs to be adjusted within a range of the adjustment angle, Output_duty is the duty cycle value, and RPM_diff is the speed.

In an embodiment, the speed is an actual speed of the speed signal minus the target speed setting value of the speed signal.

In an embodiment, the duty cycle value is a duty cycle percentage.

In summary, the motor control system of the present disclosure may adjust the motor current under different load conditions according to more flexible settings of speed setting interval and duty cycle interval.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a portable electronic device and a back cover assembly thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
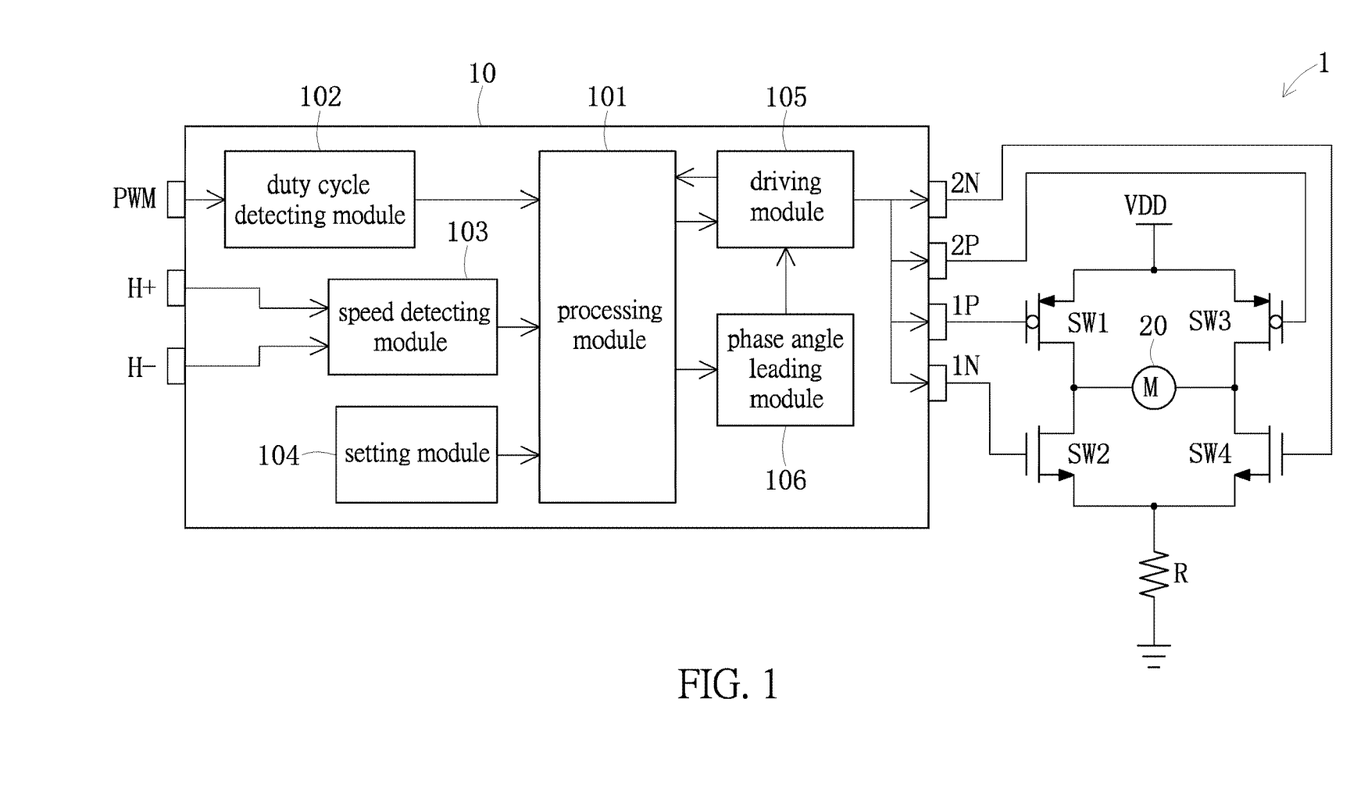
FIG. 1 shows a diagram of a motor control system according to an embodiment of the present disclosure.
Figure 2:
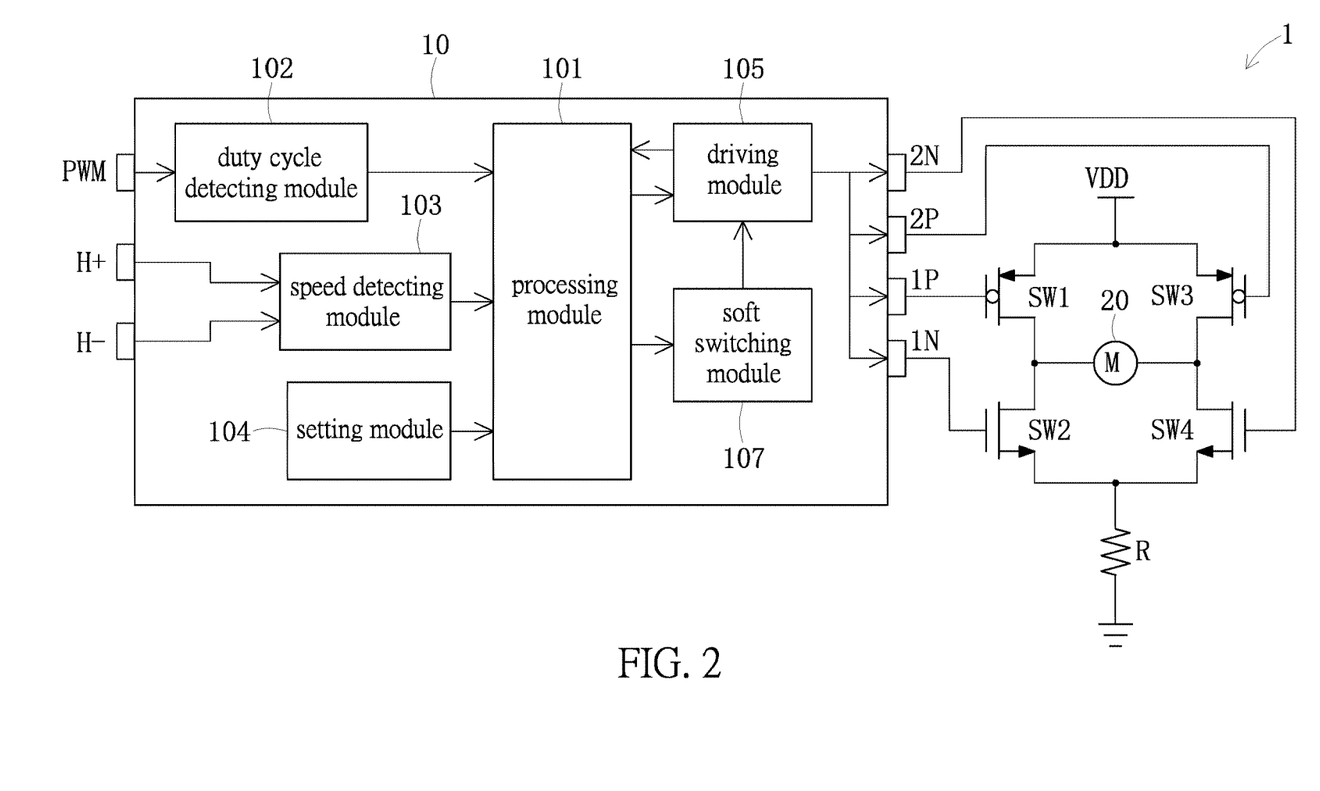
FIG. 2 shows another diagram of the motor control system according to the embodiment of the present disclosure.
Figure 3:
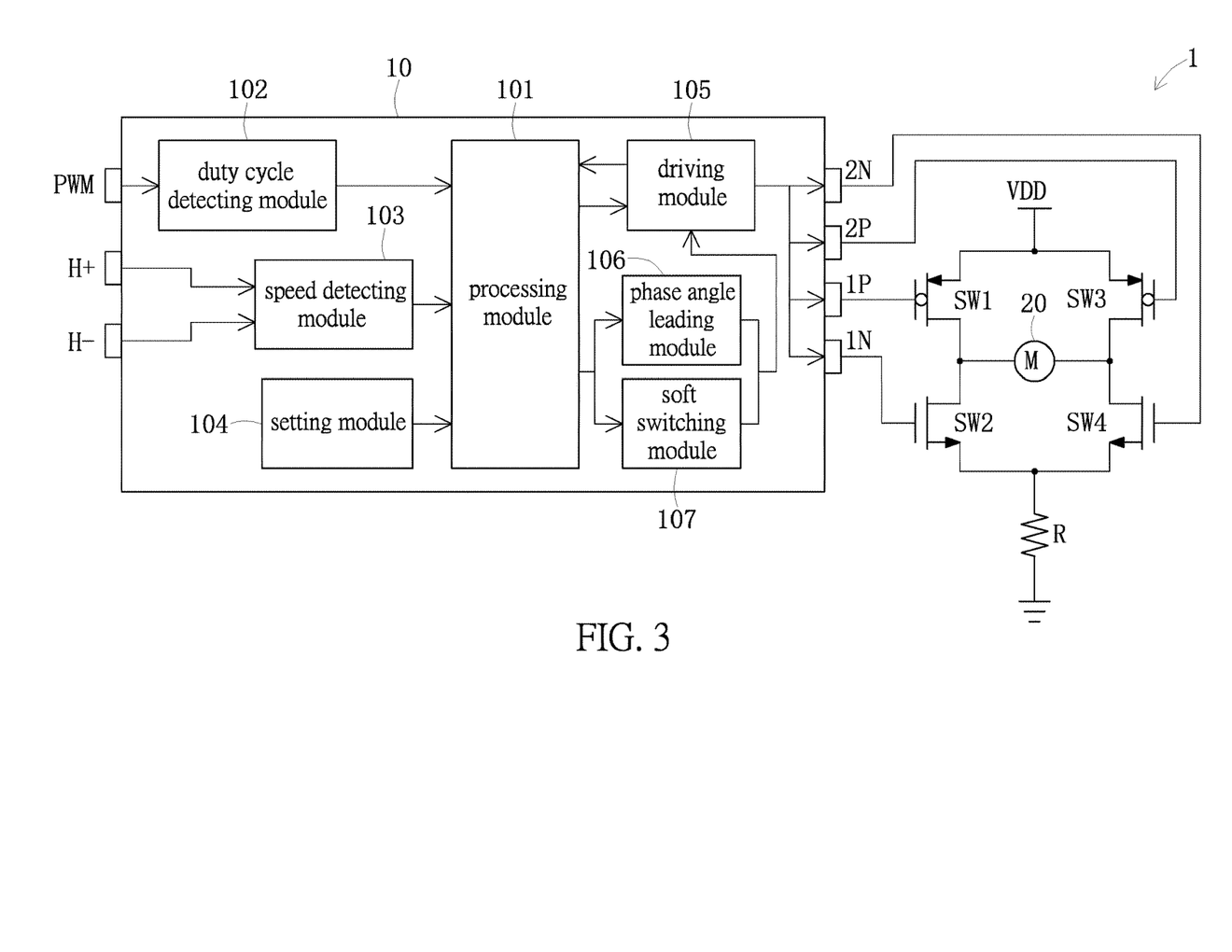
FIG. 3 shows another diagram of the motor control system according to the embodiment of the present disclosure.

Please refer to FIG. 1 to FIG. 3, FIG. 1 shows a diagram of a motor control system according to an embodiment of the present disclosure. FIG. 2 shows another diagram of the motor control system according to the embodiment of the present disclosure. FIG. 3 shows another diagram of the motor control system according to the embodiment of the present disclosure.

First, please refer to FIG. 1, in the embodiment, a motor control system 1 includes a control module 10, a motor 20, a first switch SW1, a second switch SW2, a third switch SW3 and a fourth switch SW4. In addition, the motor control system 1 further includes a resistance R.

The control module 10 has a PWM signal pin PWM, a first phase detecting pin H+, a second phase detecting pin H−, a first driving pin 1P, a second driving pin 1N, a third driving pin 2P and a fourth driving pin 2N.

In the embodiment, the control module 10 further includes a power pin (not shown) and a ground pin (not shown). The power pin (not shown) of the control module 10 is electrically connected to a dc voltage to drive the control module 10. The ground pin (not shown) of the control module 10 is electrically connected to a ground voltage. The first phase detecting pin H+ and the second phase detecting pin H− of the control module 10 is electrically connected to a phase detector for receiving change of phase of the motor 20 detected by the phase detector. That is, detecting the speed of the motor 20.

The first driving pin 1P, the second driving pin 1N, the third driving pin 2P and the fourth driving pin 2N of the control module 10 are respectively electrically connected to a second terminal of the first switch SW1, a second terminal of the second switch SW2, a second terminal of the third switch SW3 and a second terminal of the fourth switch SW4 to provide a driving signal to the first switch SW1, the second switch SW2, the third switch SW3 and the fourth switch SW4.

In the embodiment, a first terminal of the first switch SW1 and a first terminal of the third switch SW3 are electrically connected to a dc voltage VDD. A third terminal Of the first switch SW1 is electrically connected to a first terminal of the second switch SW2 and a terminal of the motor 20, a third terminal of the third switch SW3 is electrically connected to a first terminal of the fourth switch SW4 and another terminal of the motor 20. A third terminal of the second switch SW2 and a third terminal of the fourth switch SW4 are electrically connected to a terminal of the resistance R, and another terminal of the resistance R is electrically connected to the ground voltage.

In the embodiment, the control module 10 includes a processing module 101, a duty cycle detecting module 102, a speed detecting module 103, a setting module 104, a driving module 105 and a phase angle leading module 106.

In the embodiment, the duty cycle detecting module 102, the speed detecting module 103 and the setting module 104 are respectively electrically connected to the processing module 101. The processing module 101 is electrically connected to the phase angle leading module 106. The phase angle leading module 106 is electrically connected to the driving module 105. The driving module 105 is electrically connected to the first driving pin 1P, the second driving pin 1N, the third driving pin 2P and the fourth driving pin 2N to provide the driving signal to the first switch SW1, the second switch SW2, the third switch SW3 and the fourth switch SW4.

In the embodiment, the duty cycle detecting module 102 is electrically connected to the PWM signal pin PWM for receiving a PWM signal sent by the system (not shown).

The speed detecting module 103 is then electrically connected to the first phase detecting pin H+ and the second phase detecting pin H− for receiving a phase changing signal detected by the first phase detecting pin H+ and the second phase detecting pin H−, that is, the speed of the motor 20.

In the embodiment, the setting module 104 includes a storage unit (not shown) for storing a control configuration set by the user. That is, a user may set the control configuration of the control module 10 through a control interface (not shown) and the setting module 104.

The processing module 101 receives the duty cycle signal from the duty cycle detecting module 102, the speed signal from the speed detecting module 103 and the configuration of the setting module 104 to plan the driving signal. That is, the processing module 101 may provide the corresponding driving signal to the first switch SW1, the second switch SW2, the third switch SW3 and the fourth switch SW4 according to the above condition. In the embodiment, the driving module 105 further provides the duty cycle of the driving signal outputted to the first switch SW1, the second switch SW2, the third switch SW3 and the fourth switch SW4 to the processing module 101.

The current waveform is deformed by different loads of the motor 20 under different conditions or environments, thus, in the embodiment, the control module 10 provides the corresponding driving signal according to the duty cycle signal from the duty cycle detecting module 102, the speed signal from the speed detecting module 103 and the configuration of the setting module 104. The driving signal may be designed according to the following equation:

$$AA = Output\_duty * RPM\_diff \qquad \text{equation 1}$$

The adjustment angle AA is the range of angle of the driving signal to be adjusted, Output_duty is the duty cycle value, and RPM_diff is the speed.

In the embodiment, the duty cycle value Output_duty is directly based on the duty cycle percentage. For example, if the duty cycle percentage is 50%, the duty cycle value Output_duty is 50%. The speed is the value of the actual detected speed minus the target speed. For example, target speed is 500 RPM, and the actual speed is 600 RPM. For example, the speed RPM_diff is the actual speed (600

RPM) minus the target speed (500 RPM), and the speed is thus equal to 100. Through calculation based on equation 1, the adjustment angle AA is equal to the duty cycle value Output_duty (50%) multiplied by the speed RPM_diff (100), and the adjustment angle AA is equal to 50. At this moment, the adjustment angle AA is also a digital value, and may be, but not limited to being, converted to the adjustment angle required by the phase angle leading module, or the angle range to be adjusted by the soft switching.

In the embodiment, if the adjustment angle AA is to be converted to an adjustment angle with phase angle leading, the leading angle of the phase angle, such as 20°, may be preset, and the angle able to be converted to a 10-bit value (1024) is 740, 0° is 512, and negative and positive 45° are respectively 0 and 1024.

If the adjustment angle AA is to be converted to an adjustment angle required by the phase angle leading, the adjustment angle is equal to the value 740 corresponding to the leading angle 20° of the preset phase angle minus the adjustment angle AA (50), that is, 690. Then the value 690 is converted to an angle of 15.7°.

In other embodiments, the adjustment angle AA further may be converted to a range of the soft switching angle. That is, the digital value (50) of the adjustment angle AA is converted to an implement range of the soft switching according to a rule, and is not limited in the present disclosure.

In other embodiments, the above equation 1 may further include a constant for proper adjustment, such as the equation 2 in the following:

$$AA = AC * Output\_duty * RPM\_diff \qquad \text{equation 2}$$

The adjustment angle AA is the angle range that the driving signal needs to be adjusted, Output_duty is the duty cycle value, and RPM_diff is the speed. AC is an angle adjustment constant. In the embodiment, angle adjustment constant may be set for practical demand, that is, the angle adjustment constant may be an integer or a decimal, and is not limited in the present disclosure.

According to the above embodiment, the duty cycle value Output_duty, in the embodiment, is directly based on the duty cycle percentage. For example, if the duty cycle percentage is 50%, the duty cycle value Output_duty is 50%. The speed is the value of the actual detected speed minus the target speed. For example, the target speed is 500 RPM, and the actual speed is 600 RPM. For example, the speed RPM_diff is the actual speed (600 RPM) minus the target speed (500 RPM), and the speed is thus equal to 100.

In the embodiment, the angle adjusting parameter AC is set to 2, through calculation based on equation 2, the adjustment angle AA equals the angle adjusting parameter AC multiplied by the duty cycle value Output_duty (50%), and then multiplied by the speed RPM_diff (100), so that the adjustment angle AA is equal to 100. At this moment, the adjustment angle AA is also a digital value, and may be, but not limited to being, converted to the adjustment angle required by the phase angle leading module, or the angle range to be adjusted by the soft switching.

In the embodiment, if the adjustment angle AA is to be converted to an adjustment angle with phase angle leading, the leading angle of the phase angle, such as 20°, may be preset, and the angle able to be converted to a 10-bit value (1024) is 740, 0° is 512, and negative and positive 45° are respectively 0 and 1024.

If the adjustment angle AA is to be converted to an adjustment angle required by the phase angle leading, the adjustment angle is equal to the value 740 corresponding to the leading angle 20° of the preset phase angle minus the adjustment angle AA (100), that is, 640. Then, the value 640 is converted to an angle equal to 11.25°.

In the embodiment, as shown in FIG. 1, the phase angle leading module 106 is used as the main adjusting method for the control signal, the motor 20 provides an adjusting method for the leading phase angle with backward shifting angle under a smaller load condition, that is, delaying an enabling time of the control signal, so that the value corresponding to the adjustment angle AA is negative. If the motor 20 provides an adjusting method for the leading phase angle with forward shifting angle under a greater load condition, that is, advancing an enabling time of the control signal, the value corresponding to the adjustment angle AA is positive.

In another embodiment, as shown in FIG. 2, the soft switching module 107 is used as the main adjusting method for the control signal, the motor 20 provides an soft switching adjusting method for increasing soft switching time under a smaller load condition, that is, increasing the soft switching time at a start of the control signal, and decreasing the soft switching time at an end of the control signal, that is, at the start of the control signal, adding a signal with a PWM signal mode, or at the end of the control signal, decreasing the signal with the PWM signal mode, so that the value corresponding to the adjustment angle AA is negative. The motor 20 provides a soft switching adjusting method for decreasing soft switching time under greater load condition, that is, decreasing the soft switching time at a start of the control signal, and increasing the soft switching time at an end of the control signal, that is, at the start of the control signal, decreasing a signal with a PWM signal mode, and at the end of the control signal, increasing the signal with the PWM signal mode, the value corresponding to the adjustment angle AA being positive.

Please refer to FIG. 2 and FIG. 3, the motor control system 10 in FIG. 2 and the motor control system 10 in FIG. 1 are different in that the phase angle leading module 106 in FIG. 1 is replaced by the soft switching module 107. As shown in FIG. 3, the phase angle leading module 106 and the soft switching module 107 is replaced by the phase angle leading module 106 in FIG. 1.

As shown in FIG. 2, the processing module 101 is electrically connected to the soft switching module 107, and the soft switching module 107 is electrically connected to the driving module 105. As shown in FIG. 3, the processing module 101 is electrically connected to the phase angle leading module 106 and the soft switching module 107. The phase angle leading module 106 and the soft switching module 107 are electrically connected to the driving module 105. In other embodiments, the aforementioned adjustment angle AA may appropriately choose one of the phase angle leading module 106 and the soft switching module 107 by the processing module, and adjust the phase angle leading control mode or the soft switching control mode of the control signal and the driving signal by the processing module.

Figure 4:
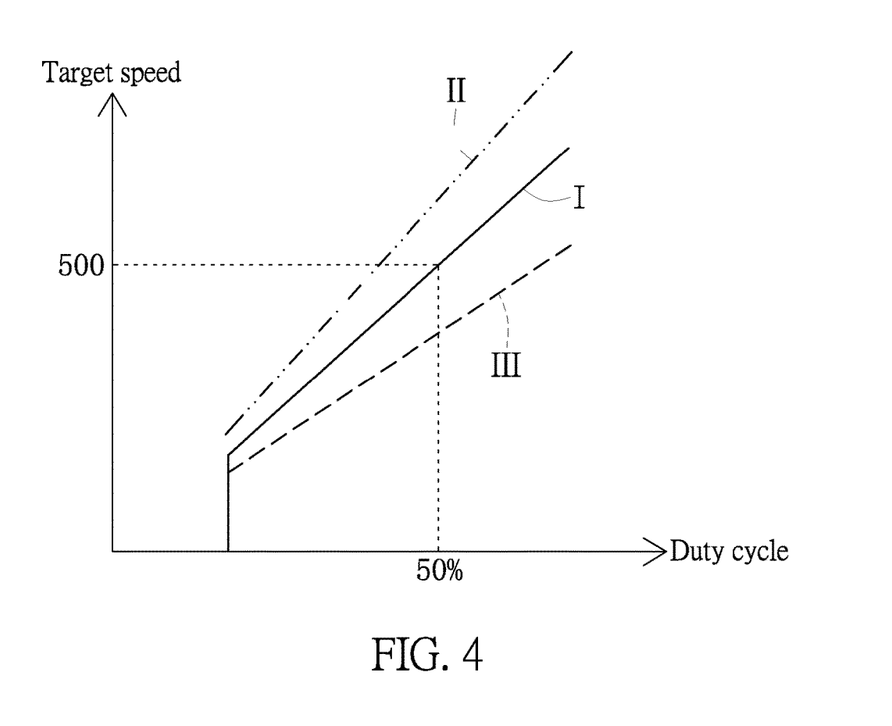
FIG. 4 shows a diagram of a speed-duty cycle curve according to the embodiment of the present disclosure.

Reference is made to FIG. 4. FIG. 4 shows a diagram of a speed-duty cycle curve according to the embodiment of the present disclosure.

The solid line I is a speed-duty cycle curve under a normal load, and the dotted line II is a speed-duty cycle curve under a light load, the dotted line III is a speed-duty cycle curve under a heavy load. That is, under different loads, the control module 10 uses different setting values of speed and duty cycle to appropriately control the motor.

Figure 5A:
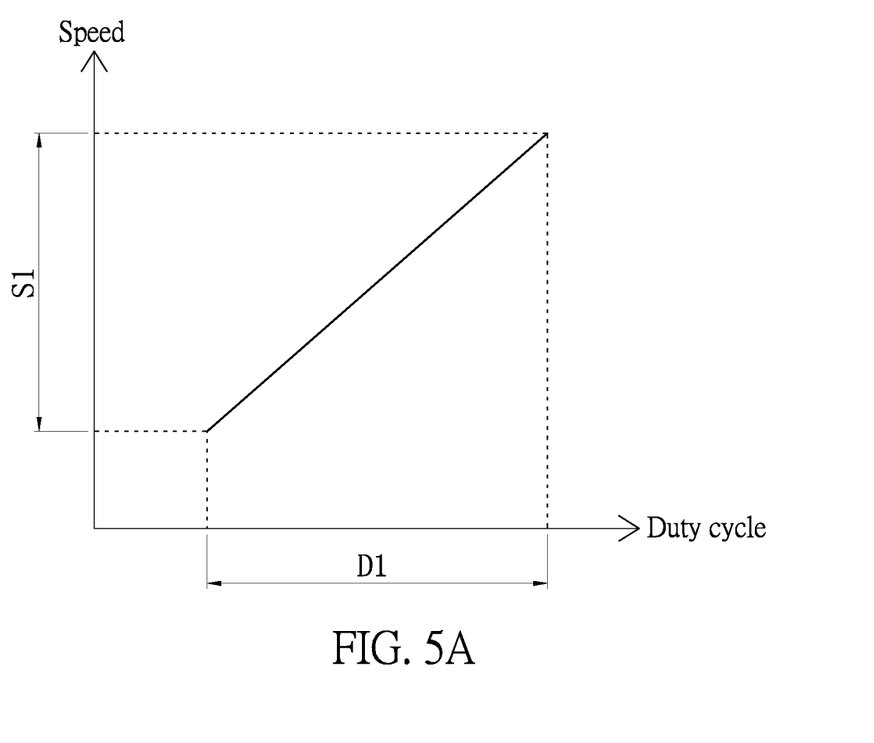
FIG. 5A shows a diagram of a speed-duty cycle curve according to the embodiment of the present disclosure.
Figure 5B:
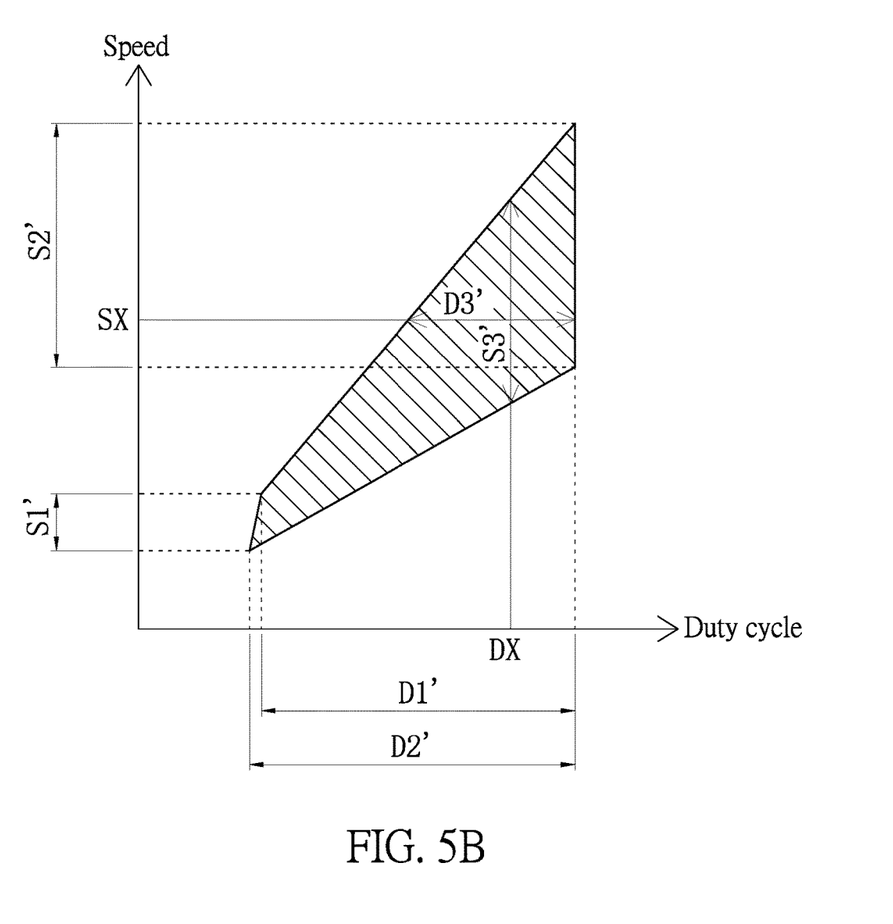
FIG. 5B shows another diagram of a speed-duty cycle curve according to the embodiment of the present disclosure.

Reference is made to FIG. 5A and FIG. 5B. FIG. 5A shows a diagram of a speed-duty cycle curve according to the embodiment of the present disclosure. FIG. 5B shows another diagram of a speed-duty cycle curve according to the embodiment of the present disclosure.

In the embodiment, as shown in FIG. 5A, the user may set the minimum and maximum of the speed, and the minimum and maximum of the corresponding duty cycle by the control interface (not shown) and the setting module 104. The control module 10 adjusts the speed and duty cycle according to the minimum and maximum of the speed, and the minimum and maximum of the corresponding duty cycle. However, the setting of the speed and duty cycle respectively sets a predetermined speed interval and a predetermined duty cycle interval.

As shown in FIG. 5B, a first speed interval S1' and a second speed interval S2' are respectively set. In addition, a first duty cycle interval D1' and a second duty cycle interval D2' are set on the duty cycle. As shown in FIG. 5B, an irregular speed-duty cycle adjustment interval in the embodiment is set to adjust the forward shifting angle or backward shifting angle of the phase angle leading module corresponding to the speed and duty cycle based on boundary conditions in linear form for different loads. In other embodiments, the range setting of adjusting the forward shifting angle or backward shifting angle of the phase angle leading mode corresponding to the speed and duty cycle may be in curve form.

Figure 6:
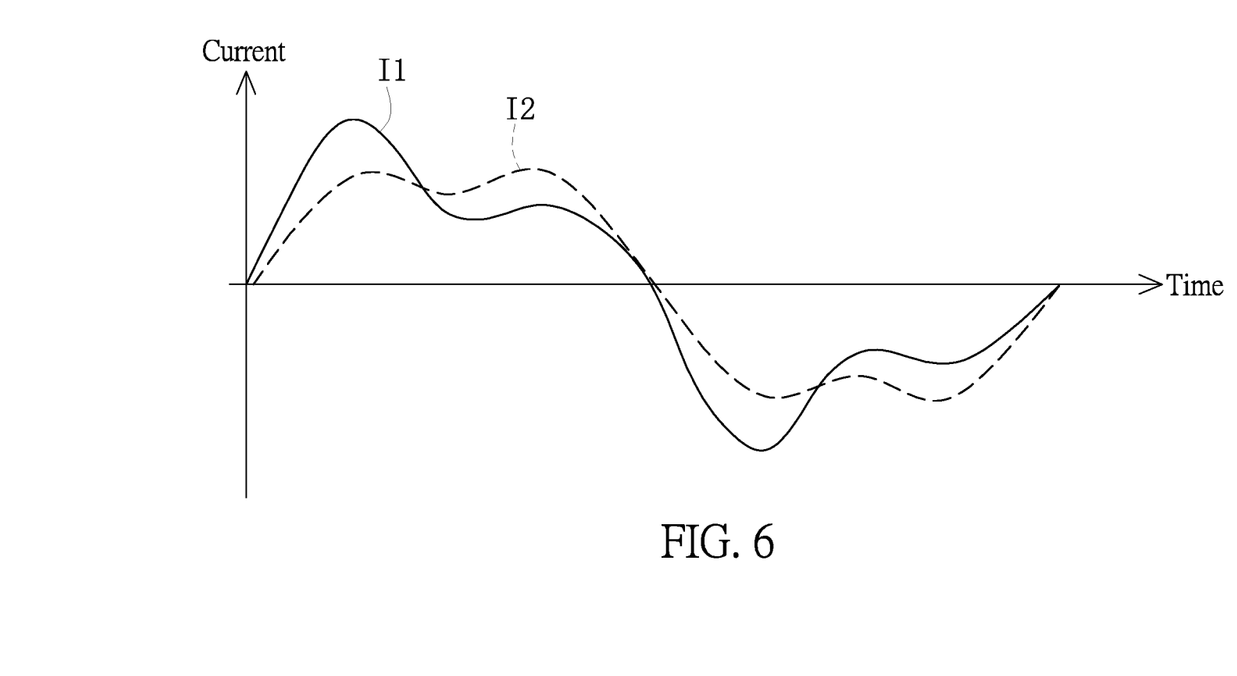
FIG. 6 shows a diagram of a current-time curve according to the embodiment of the present disclosure.

As shown in FIG. 5B, a plurality of speeds in a third speed interval included in the same predetermined duty cycle DX may be used for adjusting the forward shifting angle or backward shifting angle of the third speed interval S3 and predetermined duty cycle DX corresponding to the motor 20. A plurality of duty cycles in a third work interval included in the predetermined speed SX may be used for adjusting the forward shifting angle or backward shifting angle of the third speed interval S3 and predetermined duty cycle DX corresponding to the motor 20. A crossing point may be found by adjustment based on the predetermined duty cycle DX and predetermined speed SX, and the forward shifting angle or backward shifting angle corresponding to the crossing point (DX, SX) is thus adjusted. Reference is next made to FIG. 6, which shows a diagram of a current-time curve according to the embodiment of the present disclosure.

The first current curve I1 shown in FIG. 6 is a current curve resulting from the motor 20 with unstable load. It can be seen that the current is very unbalanced. The second current curve I2 is a current curve being adjusted according to the motor control system of the embodiment of the present disclosure, which can be seen to be more balanced.

Figure 7:
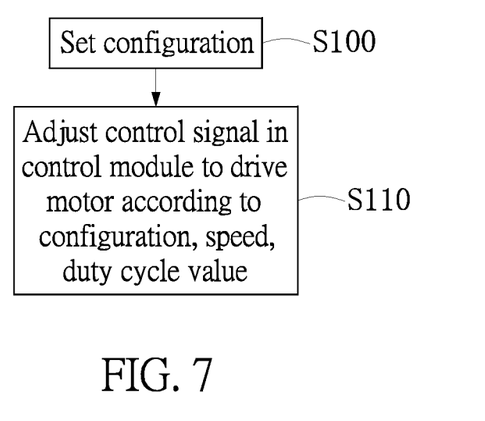
FIG. 7 shows a flowchart of a motor control method according to an embodiment of the present disclosure.

Please refer to FIG. 7, FIG. 7 shows a flowchart of a motor control method according to an embodiment of the present disclosure.

In the embodiment, a motor control method is further provided to be applied to the aforementioned motor control system, and the structure and function of the motor control system in the embodiment is not reiterated herein.

The motor control method of the embodiment includes the following steps: setting a configuration (step S100); and adjusting a control signal in the control module to drive the motor according to the configuration, speed, and duty cycle value (step S110).

In step S100, the user may set the control configuration of the control module 10 by the control interface (not shown) and the setting module 104. In the embodiment, the configuration includes at least one speed setting value, at least one speed setting interval and a duty cycle interval. That is, the first speed interval S1, the first duty cycle interval D1 and the second duty cycle interval D2 as shown in FIG. 5A and FIG. 5B.

In step S110, the current waveform of the motor 20 is deformed for different loads under different work conditions or work environments, so that the control module 10 in the embodiment provides the corresponding driving signal according to the duty cycle signal from the duty cycle detecting module 102, the speed signal from the speed detecting module 103, and the configuration of the setting module 104. The driving signal may be designed according to the following equation:

$$AA = Output\_duty * RPM\_diff \quad \text{equation 1;}$$

The adjustment angle AA is the angle range of the driving signal to be adjusted, Output_duty is the duty cycle value, and RPM_diff is the speed.

In the embodiment, the duty cycle value Output_duty in the embodiment is based directly on the percentage of the duty cycle, for example, if the duty cycle is 50%, the duty cycle value Output_duty is 50%. The speed is the actual detected speed minus the target speed. For example, the target speed is 500 RPM, and the actual speed is 600 RPM. For example, the speed RPM_diff is the actual speed (600 RPM) minus the target speed (500 RPM), and the speed is 100. According to equation 1, the adjustment angle AA is equal to the duty cycle value Output_duty (50%) multiplied by the speed RPM_diff (100), so that the adjustment angle AA is 50. At this time, the adjustment angle AA is a digital value able to be converted to the adjustment angle of the phase angle leading module, or the angle range of the soft switching to be adjusted, and is not limited in the embodiment.

If the adjustment angle is to be converted to an adjustment angle with phase angle leading, the leading angle of the phase angle may be preset, such as 20°, and the angle able to be converted to a 10-bit value (1024) is 740, 0° is 512, and negative and positive 45° are respectively 0 and 1024.

If the adjustment angle AA is to be converted to an adjustment angle required by the phase angle leading, the adjustment angle is equal to the value 740 corresponding to the leading angle 20° of the preset phase angle minus the adjustment angle AA (50), that is, 690. Then, the value 690 is converted to an angle equal to 15.7°.

In other embodiments, the adjustment angle AA may further be converted to the range of the soft switching angle. That is, the digital value (50) of the adjustment angle AA is converted to an implement range of the soft switching according to a specific rule, and is not limited in the present disclosure.

In other embodiments, the above equation 1 may further include a constant for proper adjustment, such as the equation 2 in the following:

$$AA = AC * Output\_duty * RPM\_diff \quad \text{equation 2}$$

The adjustment angle AA is the angle range of the driving signal to be adjusted, Output_duty is the duty cycle value, and RPM_diff is the speed. AC is the angle adjustment constant. In the embodiment, the angle adjustment constant may be set according to practical requirements, that is, the angle adjustment constant may be an integer or a decimal, and not limited in the present disclosure.

According to the aforementioned example, the duty cycle value Output_duty in the embodiment is directly based on the duty cycle percentage. For example, if the duty cycle percentage is 50%, the duty cycle value Output_duty is 50%.

The speed is the value of the actual detected speed minus the target speed. For example, the target speed is 500 RPM, and the actual speed is 600 RPM. For example, the speed RPM_diff is the actual speed (600 RPM) minus the target speed (500 RPM), and the speed is thus equal to 100.

In the embodiment, the angle adjusting parameter AC is set to 2, through calculation based on equation 2, the adjustment angle AA equals the angle adjusting parameter AC multiplied by the duty cycle value Output_duty (50%), and then multiplied by the speed RPM_diff (100), so that the adjustment angle AA is equal to 100. At this moment, the adjustment angle AA is also a digital value, and may be, but not limited in the embodiment, converted to the adjustment angle required by the phase angle leading module, or the angle range to be adjusted by the soft switching.

In the embodiment, if the adjustment angle is to be converted to an adjustment angle with phase angle leading, the leading angle of the phase angle may be preset, such as 20°, and the angle able to be converted to a 10-bit value (1024) is 740, 0° is 512, and negative and positive 45° are respectively 0 and 1024.

If the adjustment angle AA is to be converted to an adjustment angle required by the phase angle leading, the adjustment angle is equal to the value 740 corresponding to the leading angle 20° of the preset phase angle minus the adjustment angle AA (100), that is, 640. Then, the value 640 is converted to an angle equal to 11.25°.

In the embodiment, as shown in FIG. 1, the phase angle leading module 106 is used as the main adjusting method for the control signal, the motor 20 provides an adjusting method for the leading phase angle with backward shifting angle under a smaller load condition, that is, delaying an enabling time of the control signal, so that the value corresponding to the adjustment angle AA is negative. If the motor 20 provides an adjusting method for the leading phase angle with forward shifting angle under a greater load condition, that is, advancing an enabling time of the control signal, the value corresponding to the adjustment angle AA is positive.

In another embodiment, as shown in FIG. 2, the soft switching module 107 is used as the main adjusting method for the control signal, the motor 20 provides a soft switching adjusting method for increasing soft switching time under a smaller load condition, that is, increasing the soft switching time at a start of the control signal, and decreasing the soft switching time at an end of the control signal, that is, at the start of the control signal, adding a signal with a PWM signal mode, or at the end of the control signal, decreasing the signal with the PWM signal mode, so that the value corresponding to the adjustment angle AA is negative. The motor 20 provides a soft switching adjusting method for decreasing soft switching time under a greater load condition, that is, decreasing the soft switching time at a start of the control signal, and increasing the soft switching time at an end of the control signal, that is, at the start of the control signal, decreasing a signal with a PWM signal mode, and at the end of the control signal, increasing the signal with the PWM signal mode, so that the value corresponding to the adjustment angle AA is positive.

In other embodiments, the aforementioned adjustment angle AA shown in FIG. 3 may appropriately choose one of the phase angle leading module 106 and the soft switching module 107 by the processing module, and adjust the phase angle leading control mode or the soft switching control mode of the control signal and the driving signal by the processing module.

In summary, the motor control system of the present disclosure may adjust the motor current under different load conditions according to more flexible setting of speed setting interval and duty cycle interval.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A motor control system comprising:
a motor; and
a control module providing at least one control signal to drive the motor, the control module including:
a processing module;
a duty cycle detecting module electrically connected to the processing module to receive a PWM signal of a system to output a duty cycle signal to the control module, the processing module providing the control signal to drive the motor according to the duty cycle signal;
a speed detecting module electrically connected to the processing module to provide a speed signal corresponding to the current motor speed;
a driving module electrically connected to the processing module to provide at least one driving signal to drive the motor; and
a setting module electrically connected to the processing module to set a configuration of the control module, the setting module including at least one target speed setting value;
wherein the processing module adjusts the control signal to drive the motor according to a duty cycle value of the duty cycle signal, a speed of the speed signal and the configuration.

2. The motor control system of claim 1, wherein the driving module is electrically connected to a first switch, a second switch, a third switch and a fourth switch, and the driving module provides at least one driving signal to the first switch, the second switch, the third switch and the fourth switch according to the control signal of the processing module to drive the motor.

3. The motor control system of claim 2, wherein the processing module adjusts the driving signal according to the following equation to drive the motor:

$$AA = Output\_duty * RPM\_diff;$$

wherein AA is an adjustment angle, and the driving signal needs to be adjusted within a range of the adjustment angle, Output_duty is the duty cycle value, and RPM_diff is the speed.

4. The motor control system of claim 3, wherein the speed is an actual speed of the speed signal minus the target speed setting value of the speed signal.

5. The motor control system of claim 3, wherein the duty cycle value is a percentage of a duty cycle.

6. The motor control system of claim 2, wherein the control module further includes:
a phase angle leading module electrically connected to the processing module and the driving module to adjust a phase angle leading information of the control signal to drive the motor.

7. The motor control system of claim 2, wherein the control module further includes:
   a soft switching module electrically connected to the processing module and the driving module to adjust a soft switching information of the control signal to drive the motor.

8. The motor control system of claim 2, wherein the control module further includes:
   a phase angle leading module electrically connected to the processing module and the driving module to adjust a phase angle leading information of the control signal to drive the motor; and
   a soft switching module electrically connected to the processing module and the driving module to adjust a soft switching information of the control signal to drive the motor;
   wherein the processing module uses one of the phase angle leading module and the soft switching module to adjust the control signal to drive the motor.

9. A motor control method for a motor control system, the motor control method having a control module and a motor, wherein the control module includes a processing module and a duty cycle detecting module, the motor control method comprising the following steps:
   setting a configuration, the setting module including at least one target speed setting value; and
   adjusting a control signal of the control module according to the configuration, a speed, and a duty cycle value to drive the motor;
   wherein the duty cycle detecting module is electrically connected to the processing module to receive a PWM signal of a system to output a duty cycle signal to the control module, the processing module of the control module providing the control signal to drive the motor according to the duty cycle signal.

10. The motor control method of claim 9, wherein the configuration includes at least one speed interval and at least one duty cycle interval.

11. The motor control method of claim 10, wherein the control module adjusts the control signal according to the following equation to drive the motor:

$$AA = Output\_duty * RPM\_diff;$$

wherein AA is an adjustment angle, and the driving signal needs to be adjusted within a range of the adjustment angle, Output_duty is the duty cycle value, and RPM_diff is the speed.

12. The motor control method of claim 11, wherein the speed is an actual speed of the speed signal minus the target speed setting value of the speed signal.

13. The motor control method of claim 11, wherein the duty cycle value is a percentage of a duty cycle.

* * * * *